United States Patent
Sjungargard

(10) Patent No.: US 8,645,045 B2
(45) Date of Patent: Feb. 4, 2014

(54) FUEL TRANSFER MONITORING SYSTEM AND METHOD

(75) Inventor: Petter Sjungargard, Bristol (GB)

(73) Assignee: Airbus Operations Limited, Bristol (GB)

( * ) Notice: Subject to any disclaimer, the term of this patent is extended or adjusted under 35 U.S.C. 154(b) by 152 days.

(21) Appl. No.: 13/129,885

(22) PCT Filed: Nov. 19, 2008

(86) PCT No.: PCT/GB2008/051084
§ 371 (c)(1),
(2), (4) Date: May 18, 2011

(87) PCT Pub. No.: WO2010/058147
PCT Pub. Date: May 27, 2010

(65) Prior Publication Data
US 2011/0224871 A1    Sep. 15, 2011

(51) Int. Cl.
*B60T 7/12* (2006.01)
*B64C 17/10* (2006.01)

(52) U.S. Cl.
USPC ...................................... 701/104; 244/135 C

(58) Field of Classification Search
USPC ............. 701/36, 3, 5, 11, 14, 16, 17, 18, 102, 701/103, 104, 112, 123; 244/135 R, 135 A, 244/135 C, 203; 73/1.73, 114.38–114.54; 714/16
See application file for complete search history.

(56) References Cited

U.S. PATENT DOCUMENTS 7,073,751 B1 * 7/2006 Tighe et al. ............... 244/135 C
2008/0245130 A1 * 10/2008 Wang et al. .................. 73/1.73

FOREIGN PATENT DOCUMENTS

EP    0385046 A    9/1990

OTHER PUBLICATIONS

International Search Report and the Written Opinion for PCT/GB2008/051084 dated Oct. 29, 2009.
Russian Decision on Granting for Application No. 2011122563/11(033444) mailed Nov. 23, 2012.

* cited by examiner

*Primary Examiner* — Muhammad Shafi
(74) *Attorney, Agent, or Firm* — Lowe Hauptman & Ham, LLP

(57) ABSTRACT

A fuel monitoring system for automatically monitoring a fuel transfer in an aircraft fuel system, the fuel system including a plurality of fuel tanks, the fuel monitoring system comprises a fuel quantity sensor arranged to measure the quantity of fuel in a first fuel tank and a data processor arranged to receive a fuel quantity measurement from the sensor, wherein in response to receiving a command to transfer fuel from the first fuel tank to one or more further fuel tanks the data processor is arranged to determine the rate of change of fuel quantity in the first tank from the received fuel quantity measurement and if the rate of change of fuel quantity is less than a threshold value and the received fuel quantity measurement is greater than an expected value then the data processor is further arranged to provide an output indicating that the commanded fuel transfer has failed.

14 Claims, 3 Drawing Sheets

FUEL TRANSFER MONITORING SYSTEM AND METHOD

RELATED APPLICATIONS

The present application is a National Phase of International Application No. PCT/GB2008/051084, filed Nov. 19, 2008.

BACKGROUND TO THE INVENTION

In a relatively large fuel system having more than one individual fuel tank for providing fuel to one or more engines, such as an aircraft fuel system, it is common practice to transfer fuel from one fuel tank to one or more other fuel tanks whilst the fuel system is in use. In an aircraft fuel system this is done not only to ensure that each of the aircraft engines has fuel available at all times but to also ensure that the changing weight distribution of the aircraft as the fuel is consumed is maintained within certain limits In an aircraft fuel system the transfer of fuel between individual fuel tanks is ordinarily achieved by pumping the fuel from a source tank to one or more receiving tanks by opening and closing one or more fuel valves located within the fuel system. By providing one or more sensors on the fuel pumps and/or the valves it is possible to detect certain failure conditions within the fuel system, for example sensors can be provided to determine if a valve is in an open or shut condition and pressure sensors can be provided to determine if a fuel pump is operational or not.

However, there remain certain equipment failures or conditions that are not easily detectable and that cause a failure in the desired fuel transfer. For example, a valve shaft failure or blockage in the fuel transfer system are not presently easily detectable but can lead to failure of the fuel transfer.

In the event of the failure of a pumped fuel transfer on an aircraft it is normal operating practice to attempt a gravity fuel transfer in which it is attempted to transfer fuel from a source fuel tank to one or more receiving fuel tanks, where the source fuel tank is orientated above the receiving tanks within the fuel system at that time. For example, in some aircraft in addition to the fuel tanks located within the main aircraft wings an additional fuel tank, often termed the trim tank, is located within the horizontal stabilizers at the rear of the aircraft. Under normal flying conditions the trim tank is above at least some of the wing tanks. Consequently, provided the aircraft is in a suitable attitude then fuel can be fed under the effect of gravity from the trim tank to one or more of the wing tanks. Additionally, the outer wing tanks of an aircraft are often situated above the inner wing tanks when the aircraft is in a level flight attitude and consequently fuel can be transferred by gravity from the outer tanks to the inner wing tanks.

Whilst the aircraft flight crew generally have one or more instrument displays available to them informing them of the quantity of fuel held within any one of the individual fuel tanks, the rate at which the fuel quantity will change, i.e. the flow rate, during a fuel transfer may be relatively low, for example of the order of 3 to 20 tonnes an hour for a gravity transfer or 15 to 35 tonnes an hour for a pumped transfer. Consequently, even if the fuel transfer is progressing normally the flight crew are required to monitor the fuel quantity indicators over a relatively prolonged period of time to determine if the fuel transfer is proceeding at the expected rate. Often the flight crew need to review and monitor other instruments at the same time and it is therefore quite plausible that the fuel transfer is not monitored correctly by the flight crew. Additionally, the operation of the fuel system on the aircraft is typically arranged such that a fuel transfer may be instigated automatically by the aircraft control systems, in which case the flight crew might not be aware of the need to monitor the fuel transfer rate.

SUMMARY OF THE INVENTION

According to a first aspect of the present invention there is provided a method of automatically monitoring fuel transfer in an aircraft fuel system, the aircraft fuel system including a plurality of fuel tanks, the method comprising identifying a fuel transfer command to transfer fuel from a first one of the plurality of fuel tanks to a further one or more of the plurality of fuel tanks, monitoring the rate of change of fuel quantity in the first fuel tank and if the rate of change of fuel quantity is less than a threshold value then determining the fuel quantity in the first tank, whereby if the fuel quantity in the first tank is greater than an expected value then declaring that the fuel transfer has failed.

In the event of a fuel transfer failure, the fuel remaining in the first fuel tank may be declared unusable.

Additionally, if the fuel quantity in the first tank is less than the expected value then the method may further comprise declaring that the fuel transfer is complete.

Additionally or alternatively, the threshold value of the rate of change of fuel quantity may be less than an expected rate of change of fuel quantity during the commanded fuel transfer between the first and further fuel tanks. Additionally, the threshold value is preferably within the range of 50 to 1000 Kg of fuel per hour. The threshold value is advantageously significantly less than that expected for a normal gravity assisted fuel transfer.

The fuel transfer command may be generated either manually or automatically.

According to a further aspect of the present invention there is provided a fuel monitoring system for automatically monitoring a fuel transfer in an aircraft fuel system, the fuel system including a plurality of fuel tanks, the fuel monitoring system comprising a fuel quantity sensor arranged to measure the quantity of fuel in a first fuel tank and a data processor arranged to receive a fuel quantity measurement from the sensor, wherein in response to receiving a command to transfer fuel from the first fuel tank to one or more further fuel tanks the data processor is arranged to determine the rate of change of fuel quantity in the first tank from the received fuel quantity measurement and if the rate of change of fuel quantity is less than a threshold value and the received fuel quantity measurement is greater than an expected value then the data processor is further arranged to provide an output indicating that the commanded fuel transfer has failed.

If the received fuel quantity measurement is less than the expected value then the data processor may be arranged to provide an output indicating that the commanded fuel transfer is complete.

In the event of a declared fuel transfer failure, the data processor may be further arranged to provide an output indicating that the remaining fuel in the first tank given by the received fuel quantity measurement is unusable.

Additionally or alternatively, the threshold value of the rate of change of fuel quantity may be less than an expected rate of change of fuel quantity for the commanded fuel transfer between the first and further tanks.

Additionally, the threshold value may be within the range of 50 to 1000 Kg per hour.

Additionally or alternatively the fuel transfer command may be generated either manually or automatically.

BRIEF DESCRIPTION OF THE DRAWINGS

Embodiments of the present invention will now be described below, by way of non-limiting example only, with reference to the accompanying figures, of which.

DETAILED DESCRIPTION OF EMBODIMENTS OF THE INVENTION

Figure 1:
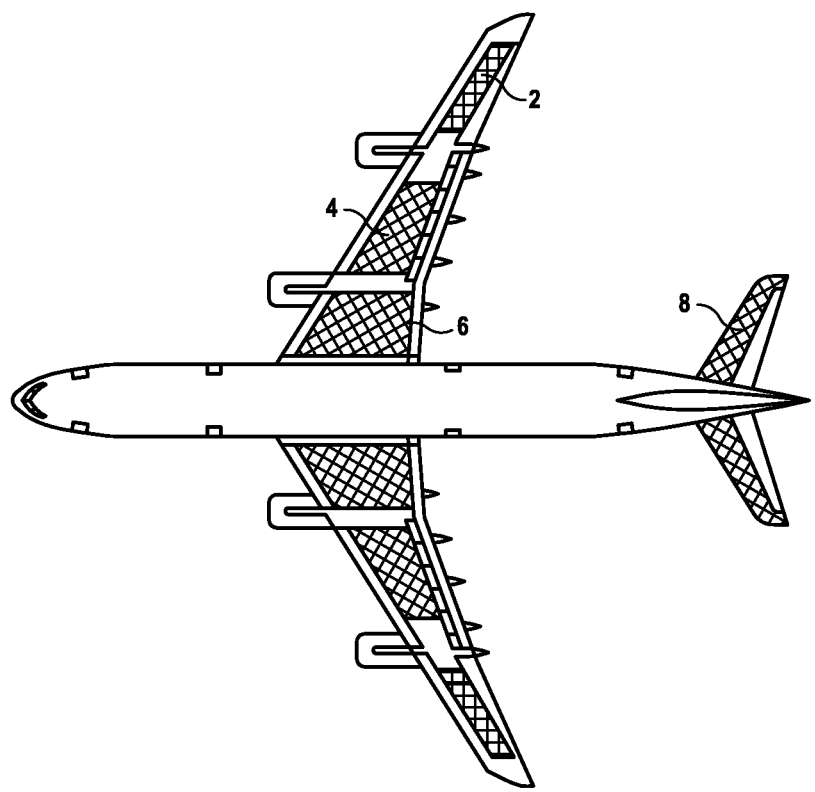
FIG. 1 schematically illustrates the location of a plurality of fuel tanks in an aircraft.

FIG. 1 schematically illustrates a conventional aircraft and the common location of the fuel tanks within the aircraft fuel system. Conventionally, each wing of the aircraft includes a number of separate fuel tanks. In the example illustrated each wing has three tanks located within it, an outer tank 2 located towards the wing tip, a mid-tank 4 located in the central section of the wing, and an inner tank 6 located in the wing adjacent to the aircraft fuselage. Also illustrated is a trim tank 8 located within the horizontal stabilizers of the aircraft. When the aircraft is flying in a level attitude the outer wing tanks 2 are located above the mid-tanks 4, which are in turn located above the inner wing tanks 6 due to the upward sweep of the wing from the fuselage towards the wing tip. Also the trim tank 8 is typically above at least the inner wing tanks 6. Consequently, in normal circumstances it should be possible to transfer fuel by gravity alone from either the outer wing tanks 2, the mid-tanks 4 or the trim tank 8 to the inner wing tanks 6. For the sake of completeness, each engine of the aircraft typically has an associated feed tank that is itself interconnected to one or more of the main fuel tanks. These are not shown in FIG. 1.

Figure 2:
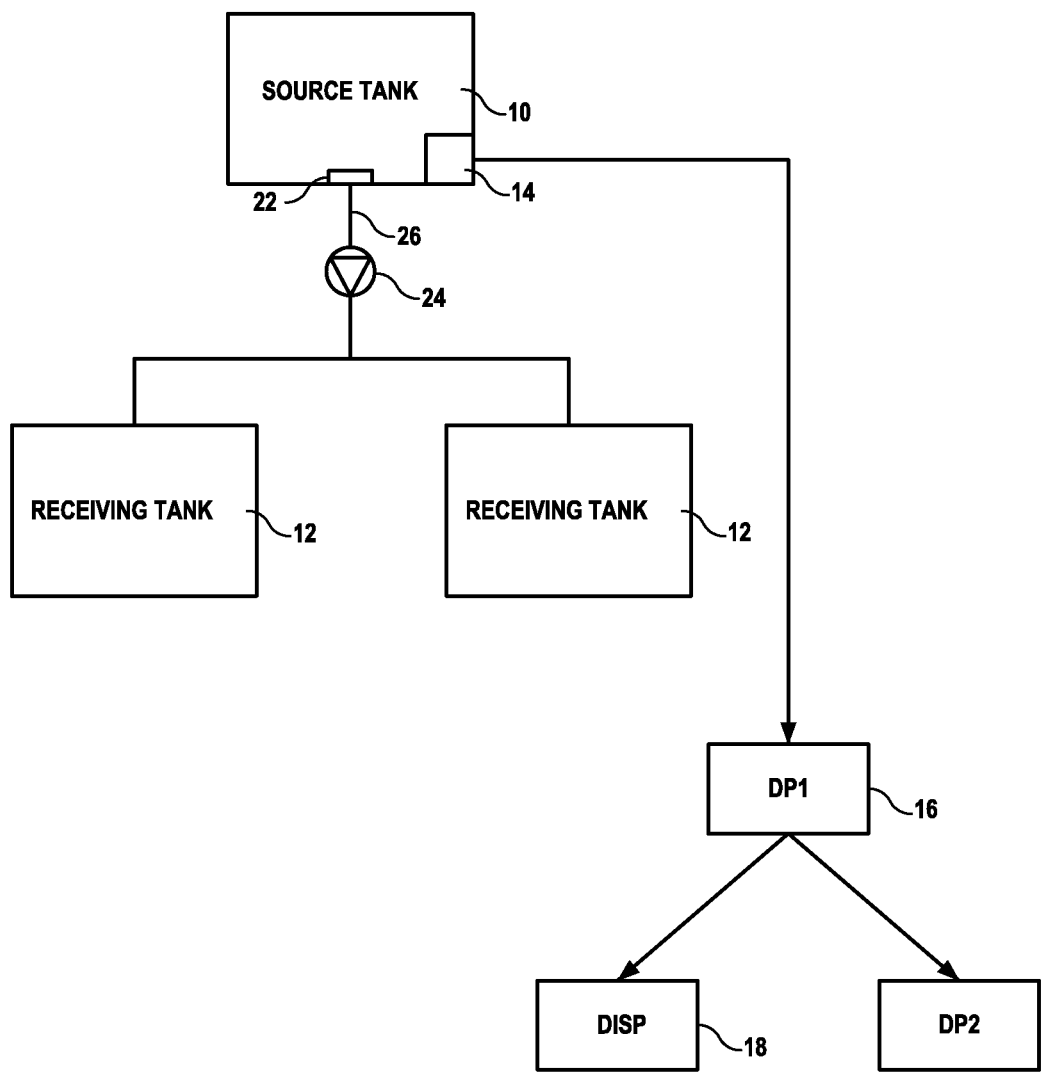
FIG. 2 schematically illustrates a fuel monitoring system according to an embodiment of the present invention.

FIG. 2 schematically illustrates part of an aircraft fuel system and a fuel transfer monitoring system according to an embodiment of the present invention. In the illustrated example a source tank 10 is taken to be located physically higher than two receiving tanks 12 within the aircraft fuel system. The source tank 10 includes a fuel quantity sensor 14 that is arranged to provide an output signal indicative of the quantity of fuel within the source tank. The fuel quantity sensor 14 may be any suitable sensor already known to the person skilled in the art. The output from the first fuel quantity sensor 14 within the source tank 10 is provided to a data processor 16. The data processor 16 is preferably connected to a display 18, or other suitable output, visible by the aircraft flight crew and one or more further data processors. Under normal operating conditions when it is desired to transfer fuel from the source tank 10 to the receiving tanks 12 a fuel pump 22, typically located within the source tank 10 is operated, in conjunction with a fuel valve 24 located within a fuel transfer line 26 connecting the fuel tanks, to pump the desired quantity of fuel from the source tank 10 to the receiving tanks 12. In the event of a pumped transfer not being possible, due to a failure of the fuel pump for example, a gravity fuel transfer will generally be requested, either automatically by the aircraft control systems or manually by the aircraft flight crew. To accomplish a gravity fuel transfer the valve 24 controlling the flow of fuel between the source tank 10 and receiving tanks 12 will be set to the open position to allow fuel to drain under the action of gravity from the source tank 10 to the receiving tanks. The fuel transfer monitoring system of embodiments of the present invention may be used to monitor the progress of either a pumped fuel transfer or a gravity fuel transfer.

Figure 3:
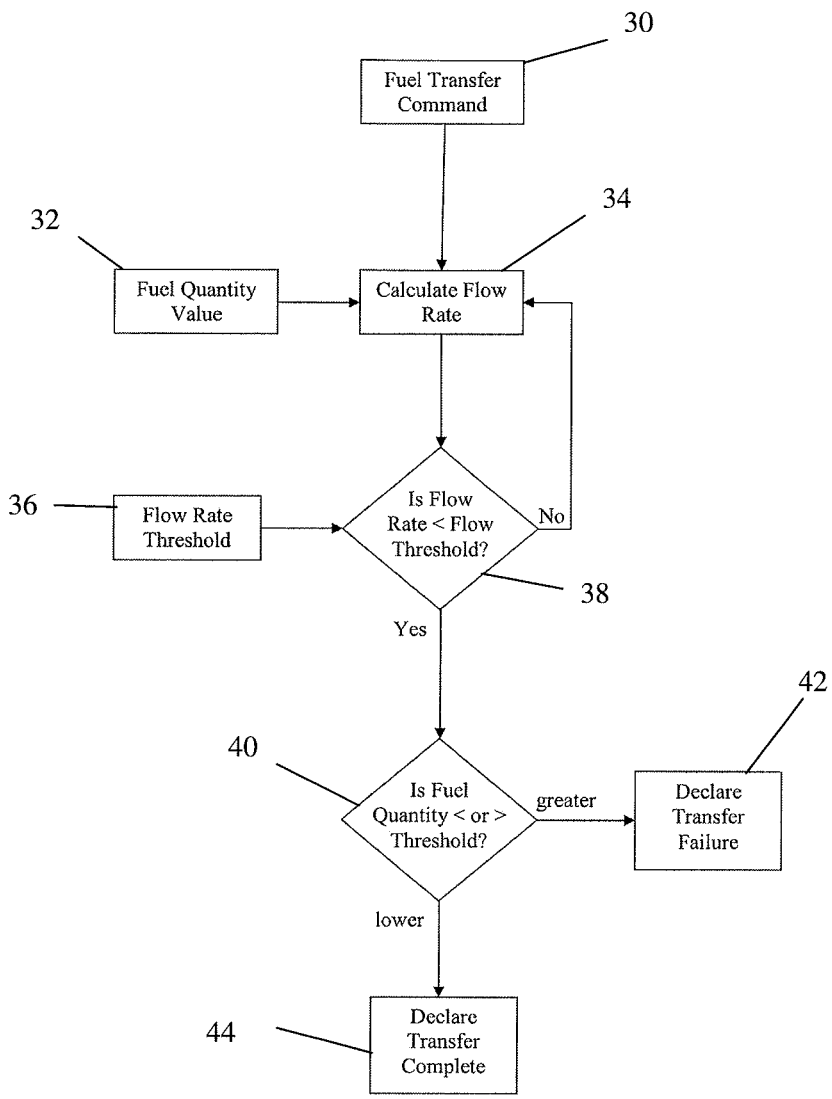
FIG. 3 shows a flow chart of a method of monitoring a fuel transfer according to an embodiment of the present invention.

FIG. 3 illustrates the method of operation of a fuel transfer monitoring system in accordance with an embodiment of the present invention in the form of a flow chart. The fuel transfer monitoring is initiated in response to a fuel transfer command 30 being issued, which may be generated automatically or manually. Following the identification of the fuel transfer command the fuel quantity value 32 of the fuel in the source fuel tank 10 is monitored, the fuel quantity being provided by the fuel quantity sensor 14 within the source tank, and from this a value for the flow rate 34, or rate of change of fuel quantity, over a given period of time is calculated. The calculated flow rate 34 is compared with a predetermined flow rate threshold 36 to determine if the calculated flow rate is less than the flow rate threshold value. If the outcome of this comparison 38 is that the calculated flow rate is not less than the threshold value then the calculated flow rate of fuel from the source tank 10 is updated 34. If the outcome of the comparison 38 is that the flow rate from the first tank 10 is below the flow rate threshold value 36 then the method progresses to a further comparison step 40 at which the reported fuel quantity value 32 from the source fuel tank 10 is compared with a further fuel quantity threshold value corresponding to the fuel level when the commanded transfer is normally expected to stop. If the reported fuel quantity value in the source fuel tank 10 is greater than the fuel quantity threshold value then the fuel transfer is declared to have failed 42. A corresponding alert or message is provided from the data processor 16 of the fuel transfer monitoring system to the flight crew display 18 reporting that the fuel transfer has been declared to have failed. If the reported fuel quantity value remaining in the source fuel tank 10 is less than the fuel quantity threshold then the fuel transfer is declared to be complete 44, or successful, and a corresponding message may be provided by the data processor to the flight crew display 18 to notify the flight crew that the fuel transfer is complete.

In preferred embodiments the flow rate threshold value is set to be substantially less than the flow rate that would be expected for a gravity fuel transfer between the respective fuel tanks. Under ordinary conditions the expected fuel flow rate for a gravity transfer is in the range of 3 to 20 tonnes of fuel per hour. In embodiments of the present invention preferred values for the flow rate threshold value are, for example, between three and five times less than this, for example in the range of 50 to 1000 Kg of fuel per hour. For example, in a particular embodiment of the present invention the flow rate threshold may be 100 Kg of fuel per hour.

The fuel quantity threshold value used in the second comparison 40 may be predetermined as a function of the fuel system and design, which in turn will dictate the expected remaining amount of fuel likely in any given fuel tank after a fuel transfer.

Embodiments of the present invention therefore provide a fuel transfer monitoring system and method of monitoring a fuel transfer in a fuel system that is capable of determining when a fuel transfer is either complete or has failed without requiring any human intervention.

The invention claimed is:

1. A method of automatically monitoring fuel transfer in the aircraft fuel monitoring system, the method comprising:
in response to a fuel transfer command to transfer fuel from a first one of the plurality of fuel tanks to a further one or more of the plurality of fuel tanks, monitoring the rate of change of fuel quantity in the first fuel tank by using a fuel quantity sensor and if the rate of change of fuel quantity is less than a flow rate threshold value, the method then comprises using the fuel quantity sensor to determine the fuel quantity in the first fuel tank and using a data processor to compare the quantity to a fuel quantity threshold value corresponding to an expected quantity of fuel remaining in the first fuel tank after the commanded fuel transfer is normally expected to have stopped, whereby if the fuel quantity in the first tank is greater than the fuel quantity threshold value then the data processor declares that the fuel transfer has failed.

2. The method of claim 1, wherein the quantity of fuel remaining in the first fuel tank is subsequently declared unusable.

3. The method of claim 1, whereby if the fuel quantity in the first tank is less than the expected quantity then declaring that the fuel transfer is complete.

4. The method of claim 1, whereby the flow rate threshold value is less than an expected rate of change of fuel quantity during the commanded fuel transfer between the first and further fuel tanks.

5. The method of claim 4, whereby the flow rate threshold value is within the range of 50-1000 Kg of fuel per hour.

6. The method of claim 1, whereby the fuel transfer command is generated either manually or automatically.

7. The method of claim 1, whereby the commanded fuel transfer is either a pumped transfer or a gravity transfer.

8. A fuel monitoring system for automatically monitoring a fuel transfer in an aircraft fuel system, the fuel system including a plurality of fuel tanks, the fuel monitoring system comprising a fuel quantity sensor arranged to measure the quantity of fuel in a first fuel tank and a data processor arranged to receive a fuel quantity measurement from the sensor, wherein in response to receiving a command to transfer fuel from the first fuel tank to one or more further fuel tanks the data processor is arranged to determine the rate of change of fuel quantity in the first tank and the quantity of fuel remaining in the first fuel tank and if the rate of change of fuel quantity is less than a flow rate threshold value and if the quantity of fuel remaining in the first fuel tank is greater than a fuel quantity threshold value corresponding to an expected quantity of fuel remaining in the first fuel tank after the commanded fuel transfer is normally expected to have stopped then the data processor is further arranged to provide an output indicating that the commanded fuel transfer has failed.

9. The fuel monitoring system of claim 8, wherein if the received fuel quantity measurement is less than the expected quantity the data processor is arranged to provide an output indicating that the commanded fuel transfer is complete.

10. The fuel monitoring system of claim 8, wherein the data processor is further arranged to provide an output indicating that the remaining fuel in the first tank given by the received fuel quantity measurement is unusable.

11. The fuel monitoring system of claim 8, wherein the flow rate threshold value is less than an expected rate of change of fuel quantity during the commanded fuel transfer between the first and further tanks.

12. The fuel monitoring system of claim 11, wherein the flow rate threshold value is within the range of 50-1000 Kg per hour.

13. The fuel monitoring system of claim 8, wherein the fuel transfer command is generated either manually or automatically.

14. The fuel monitoring system of claim 8, wherein the commanded fuel transfer is either a pumped transfer or a gravity transfer.

* * * * *